US005900804A

United States Patent [19]

Yewell

[11] Patent Number: 5,900,804

[45] Date of Patent: May 4, 1999

[54] INDICATING POWER CORD SYSTEM

[76] Inventor: Ronald E. Yewell, Box 9 Site #7 RR#3 Rocky Mountain House, Alberta, Canada, T0M IT0

[21] Appl. No.: 08/893,609

[22] Filed: Jul. 11, 1997

[51] Int. Cl.[6] .............................. B60Q 1/00; G08B 21/00

[52] U.S. Cl. ........................ 340/425.5; 340/449; 340/586; 340/599; 340/643; 340/660; 340/635; 340/657; 361/79; 361/86; 324/508; 324/522

[58] Field of Search ................................ 340/426, 425.5, 340/635, 656, 693, 657, 661, 664, 870.05, 449, 586, 599, 643, 660; 361/1, 87, 86, 79, 78; 324/511, 510, 508, 522; 705/412

[56] References Cited

U.S. PATENT DOCUMENTS

| | | | |
|---|---|---|---|
| 4,583,086 | 4/1986 | Andrews et al. | 340/640 |
| 4,924,404 | 5/1990 | Reinke, Jr. | 364/464.04 |
| 5,315,236 | 5/1994 | Lee | 324/157 |
| 5,525,965 | 6/1996 | Liebenthal | 340/568 |
| 5,631,565 | 5/1997 | Winter | 340/635 |
| 5,635,895 | 6/1997 | Murr | 340/870.03 |
| 5,710,691 | 1/1998 | Fowler et al. | 361/94 |

*Primary Examiner*—Donnie L. Crosland

[57] ABSTRACT

A indicating power cord system including a housing and an elongated extension cord having a first end connected to the housing and a second end having a plug coupled thereto for being releasably inserted in a standard electrical receptacle to receive power therefrom. Next provided is an electrical outlet positioned on the housing for being electrically connected to a block heater of a vehicle. The electrical outlet is electrically connected to the extension cord with a relay contact and associated relay coil connected therebetween. The relay contact has a closed unbiased orientation upon the lack of receipt of current by the relay coil and an open biased orientation upon the receipt of current by the relay coil. Also included is a thermistor positioned on the heater block of the vehicle. The thermistor can be connected to the relay coil for providing current thereto upon the engine block reaching a predetermined temperature. Further provided is a power consumption level indicator for signalling the amount of power being delivered to the block heater of the vehicle, if any.

1 Claim, 3 Drawing Sheets

INDICATING POWER CORD SYSTEM

BACKGROUND OF THE INVENTION

1. Field of the Invention

The present invention relates to a indicating power cord system and more particularly pertains to indicating the approximate level of power consumption of an appliance and allowing the optional automatic controlling the delivery of power to the appliance.

2. Description of the Prior Art

The use of block heater monitors is known in the prior art. More specifically, block heater monitors heretofore devised and utilized for the purpose of indicating the status of power flow to an appliance such as a block heater are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,207,594 to Olson; U.S. Pat. No. 4,583,086 to Andrews et al; U.S. Pat. No. Des. 319,609 to Brown; U.S. Pat. No. 5,097,249 to Yamamoto; U.S. Pat. No. 4,983,955 to Ham, Jr. et al. and U.S. Pat. No. 4,558,310 to McAllise.

In this respect, the indicating power cord system according to the present invention substantially departs from the conventional concepts and designs of the prior art, and in so doing provides an apparatus primarily developed for the purpose of indicating the approximate level of power consumption of an appliance and allowing the optional automatic controlling the delivery of power to the appliance.

Therefore, it can be appreciated that there exists a continuing need for a new and improved indicating power cord system which can be used for verifying the delivery of power to an appliance, indicating the approximate level of power consumption of the appliance and allowing the optional automatic controlling the delivery of power to the appliance. In this regard, the present invention substantially fulfills this need.

SUMMARY OF THE INVENTION

In view of the foregoing disadvantages inherent in the known types of block heater monitors now present in the prior art, the present invention provides an improved indicating power cord system. As such, the general purpose of the present invention, which will be described subsequently in greater detail, is to provide a new and improved indicating power cord system which has all the advantages of the prior art and none of the disadvantages.

To attain this, the present invention essentially comprises a housing having a top face, a bottom face, a pair of end faces, and a pair of side faces defining an interior space. An elongated extension cord is provided having a first end connected to one of the end faces of the housing via a grommet. As shown in FIG. 2, a second end of the extension cord has a plug coupled thereto for being releasably inserted in a standard electrical receptacle to receive power therefrom. Next provided is a first electrical outlet positioned on one of the side faces of the housing and electrically connected directly to the extension cord for receiving power therefrom unconditionally. Associated therewith is a second electrical outlet positioned on one of the side faces of the housing opposite of the first electrical outlet for being electrically connected to a block heater of a vehicle. The second electrical outlet is electrically connected to the extension cord with a relay contact and associated relay coil connected therebetween. Note FIG. 4. During use, the relay contact has a closed unbiased orientation upon the lack of receipt of current by the relay coil and an open biased orientation upon the receipt of current by the relay coil. Further included is a thermistor positioned adjacent an engine of a vehicle. The thermistor has an elongated cord attached thereto with such cord having a plug connected thereto, as shown in FIGS. 1 & 4. Such plug is adapted to be releasably inserted within an adapter positioned on one of the end faces of the housing. Electrically, the thermistor is connected to the relay coil when the plug is inserted within the adapter for providing current thereto upon the engine block reaching a predetermined temperature. With reference to FIG. 4 in particular, a rectifier means is provided with a transformer connected to the plug of the extension cord. A bridge rectifier and a voltage regulator are in turn connected to the transformer for providing direct current when the plug is connected to the standard electrical receptacle. Connected to the bridge rectifier is an actuation light emitting diode for illuminating when the plug is in receipt of power. Next provided is current detection means connected to the plug of the extension cord. The current detection means is adapted to provide a voltage upon the flow of current between the plug of the extension cord and the outlets. A plurality of power consumption indicating light emitting diode circuits are connected to the current detection means for receiving power therefrom. Each power consumption indicating light emitting diode circuit is adapted to emit a light upon the receipt of a unique corresponding power level signal. With continuing reference to FIG. 4, it can be seen that control circuitry is connected to the rectifier means for receiving power therefrom. The control circuitry is further connected to the plurality of power consumption indicating light emitting diode circuits. During use of the present invention, the control circuitry is adapted to emit a power level signal to the power consumption indicating light emitting diode circuits that corresponds to the level of power being consumed by the outlets. Finally, theft prevention means is included. Note FIG. 1. Such means includes an eyelet formed in the housing and a cable. The cable has a first end with a loop formed therein and a second end with a ball coupled thereto. By this structure, the cable may be situated through the eyelet and the ball may be subsequently situated through the loop such that the bulb may be situated within the engine compartment of the vehicle with the housing remaining exterior of the vehicle. The ball thus precludes the theft of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved indicating power cord system which has all the advantages of the prior art block heater monitors and none of the disadvantages.

It is another object of the present invention to provide a new and improved indicating power cord system which may be easily and efficiently manufactured and marketed.

It is a further object of the present invention to provide a new and improved indicating power cord system which is of a durable and reliable construction.

An even further object of the present invention is to provide a new and improved indicating power cord system which is susceptible of a low cost of manufacture with regard to both materials and labor, and which accordingly is then susceptible of low prices of sale to the consuming public, thereby making such indicating power cord system economically available to the buying public.

Still yet another object of the present invention is to provide a new and improved indicating power cord system which provides in the apparatuses and methods of the prior art some of the advantages thereof, while simultaneously overcoming some of the disadvantages normally associated therewith.

Still another object of the present invention is to indicate the approximate level of power consumption of an appliance and allow the optional automatic controlling the delivery of power to the appliance if so desired.

Lastly, it is an object of the present invention to provide a new and improved indicating power cord system including a housing and an elongated extension cord having a first end connected to the housing and a second end having a plug coupled thereto for being releasably inserted in a standard electrical receptacle to receive power therefrom. Next provided is an electrical outlet positioned on the housing for being electrically connected to a block heater of a vehicle. The electrical outlet is electrically connected to the extension cord with a relay contact and associated relay coil connected therebetween. The relay contact has a closed unbiased orientation upon the lack of receipt of current by the relay coil and an open biased orientation upon the receipt of current by the relay coil. Also included is a thermistor positioned on the heater block of the vehicle. The thermistor can be connected to the relay coil for providing current thereto upon the engine block reaching a predetermined temperature. Further provided is a power consumption level indicator for signalling the amount of power being delivered to the block heater of the vehicle, if any.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
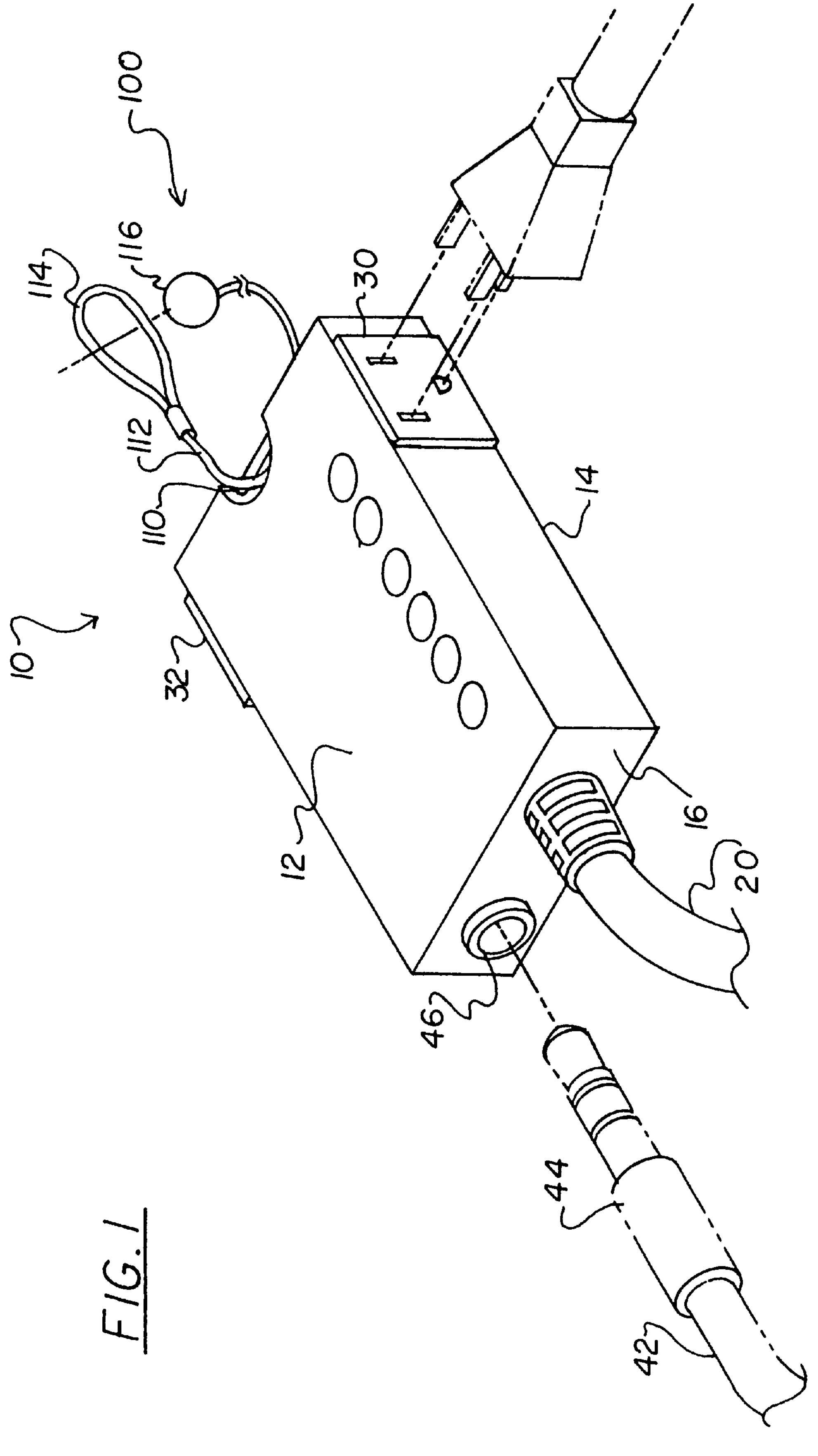
FIG. 1 is a perspective illustration of the preferred embodiment of the indicating power cord system constructed in accordance with the principles of the present invention.

With reference now to the drawings, and in particular to FIG. 1 thereof, a new and improved indicating power cord system embodying the principles and concepts of the present invention and generally designated by the reference numeral 10 will be described.

The present invention, the new and improved indicating power cord system, is comprised of a plurality of components. Such components in their broadest context include a housing, an extension cord and plug, a first and second electrical outlet, a thermistor, an actuation light, a rectifier means, a current detection means, a plurality of power consumption indicator lights, and control circuitry. Such components are individually configured and correlated with respect to each other so as to attain the desired objective.

Figure 2:
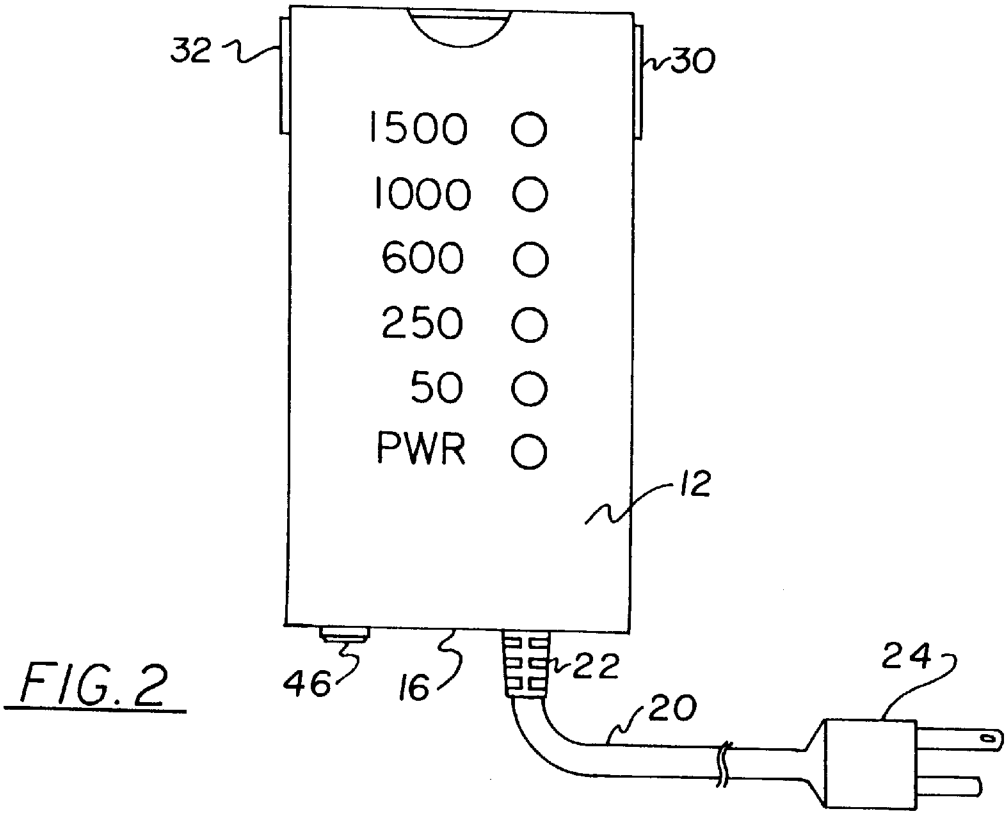
FIG. 2 is a front elevational view of the housing of the present invention.
Figure 3:
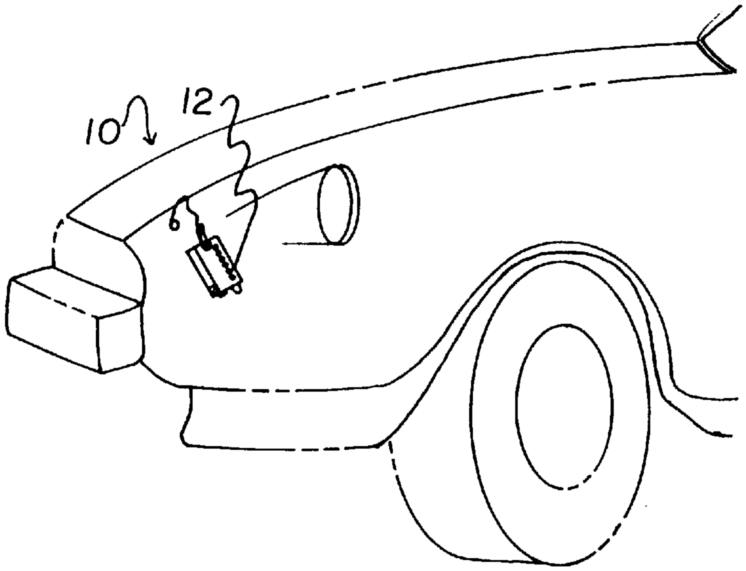
FIG. 3 is a perspective view of the theft prevention means of the present invention in use.

More specifically, it will be noted that the system 10 of the present invention includes a housing having a top face 12, a bottom face 14, a pair of end faces 16, and a pair of side faces 18 defining an interior space. An elongated extension cord 20 is provided having a first end connected to one of the end faces of the housing via a grommet 22. In an alternate embodiment, the extension cord may be releasably attached to the housing, thereby rendering the housing to be handheld. Further, as yet another alternative, the housing is molded to the cord for affording a weather proof joint. As shown in FIG. 2, a second end of the extension cord has a plug 24 coupled thereto for being releasably inserted in a standard electrical receptacle, not shown, to receive power therefrom. Ideally, the extension cord is adapted to remain flexible in temperatures in the order of −40 Fahrenheit.

Next provided is a first electrical outlet 30 positioned on one of the side faces of the housing and electrically connected directly to the extension cord for receiving power therefrom unconditionally.

Associated therewith is a second electrical outlet 32 positioned on one of the side faces of the housing opposite of the first electrical outlet for being electrically connected to a block heater of a vehicle. In the alternative, the outlets may be connected to submersible pumps, heating equipment, roof mounted fans or air conditioning equipment. The second electrical outlet is electrically connected to the extension cord with a relay contact 34 and associated relay coil 36 connected therebetween. Note FIG. 4. During use, the relay contact has a closed unbiased orientation upon the lack of receipt of current by the relay coil and an open biased orientation upon the receipt of current by the relay coil. To allow a user to differentiate the two outlets, each is constructed of a unique color. Green and red are preferably employed for the first and second outlet, respectively.

Figure 4:
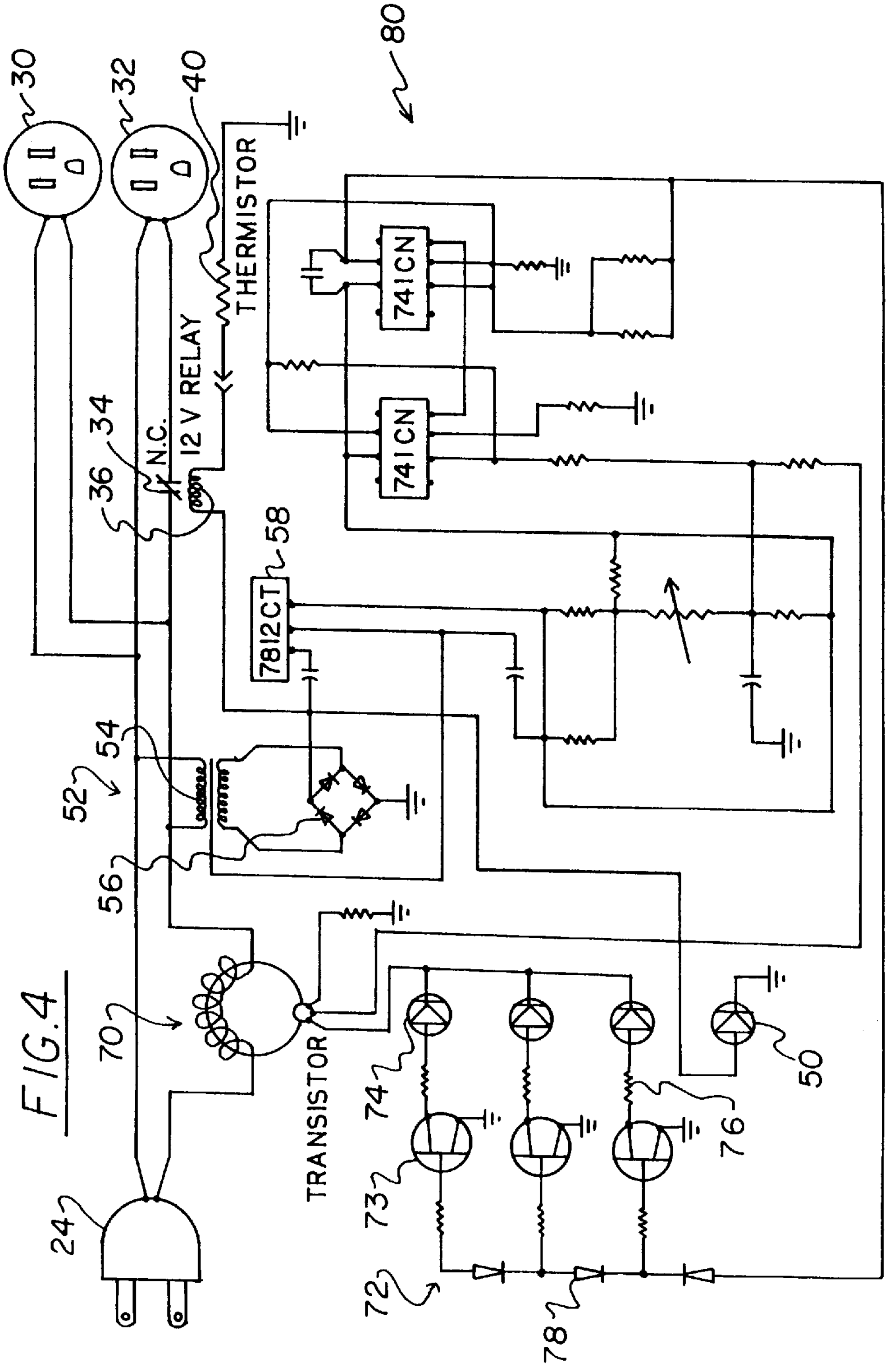
FIG. 4 is a schematic diagram depicting the interconnection of the various electrical components of the present invention.

Further included is a thermistor 40 positioned adjacent an engine of a vehicle where it will be responsive to an anti-freeze temperature of the engine. The thermistor has an elongated cord 42 attached thereto with such cord having a plug 44 connected thereto, as shown in FIGS. 1 & 4. Such plug is adapted to be releasably inserted within an adapter 46 positioned on one of the end faces of the housing. Electrically, the thermistor is connected to the relay coil when the plug is inserted within the adapter for allowing current to flow therethrough upon the engine block reaching a predetermined temperature. It should be understood that the second outlet functions unconditionally when the thermistor is detached from the adapter. Also, in alternate embodiments, various other sensors may be utilized to deactivate the second outlet as a function of pressure, flow of fluid, fluid levels, humidity, light, motion, and speed.

With reference to FIG. 4 in particular, a rectifier means 52 is provided with a transformer 54 connected to the plug of the extension cord. A bridge rectifier 56 and a 12 Volt voltage regulator 58 are in turn connected to the transformer for providing direct current when the plug is connected to the standard electrical receptacle. In the preferred embodiment, the voltage regulator comprises a solid state component (MODEL #7812CT). The bridge rectifier is adapted to supply a voltage to the relay coil and to serve as a source of power for the comparator circuit and the light emitting diodes.

Connected to the rectifier means is an actuation light emitting diode 50 for illuminating when the plug 24 is in receipt of power. It should be noted that the actuation light emitting diode is also connected to ground. As such, the present LED is adapted for indicating that the plug is properly plugged into the power receptacle.

Next provided is current detection means 70 connected to the plug of the extension cord. The current detection means is adapted to provide a voltage upon the flow of current between the plug of the extension cord and at least one of the outlets. The current detection means is designed to not be affected by the current drawn by the rectifier means. In the preferred embodiment, the current detection means comprises a transistor.

A plurality of power consumption indicating light emitting diode circuits 72 are connected to the current detection means for receiving power therefrom. Each power consumption indicating light emitting diode circuit is adapted to emit a light upon the receipt of a unique corresponding power level signal. As shown in FIG. 4, not all of the power consumption indicating light emitting diode circuits are shown for purposes of clarity. Further, each circuit includes a transistor 73 with an emitter thereof connected to ground. A light emitting diode 74 is connected between a collector of the associated transistor 73 and the current detection means. As shown in FIGS. 1 & 2, the light emitting diodes are situated on the top face of the housing. It should be noted that each of the light emitting diodes are of a unique color. A current limiting resistor 76 may connected between the light emitting diode and the corresponding transistor if necessary. It should be noted that the power level signals are received via the bases of the transistors. In the preferred embodiment, a plurality of diodes 78 are interconnected between the bases of the transistors. Also, there is a circuit to indicate at least 5 different levels of power consumption including 50 W, 250 W, 600 W, 1 KW, and 1.5 KW. Indicia is printed adjacent each associated LED to identify the power level associated with the same.

With continuing reference to FIG. 4, it can be seen that control circuitry 80 is connected to the rectifier means for receiving power therefrom. The control circuitry is further connected to the current detection means and the plurality of power consumption indicating light emitting diode circuits. During use of the present invention, the control circuitry is adapted to emit a power level signal to the power consumption indicating light emitting diode circuits that corresponds to the level of power being consumed by the outlets. The control circuitry preferably includes a pair of comparator integrated circuits, or chips, (MODEL #741CN) with a plurality of capacitors and resistors interconnected as shown in FIG. 4 to afford proper operation of the present invention. It should be noted that all of the electrical components of the present invention are situated within the housing.

Finally, theft prevention means 100 is included. Note FIG. 1. Such means includes an eyelet 110 formed in the housing and a cable 112. The eyelet is preferably formed in an end face of the housing opposite the end face to which the extension cord and adapter are situated. See FIG. 1. The cable has a first end with a loop 114 formed therein and a second end with a ball 116 coupled thereto. By this structure, the cable may be situated through the eyelet and the ball may be subsequently situated through the loop such that the bulb may be situated within the engine compartment of the vehicle with the housing remaining exterior of the vehicle. The ball thus precludes the theft of the housing.

In an alternate embodiment, the housing may be positioned within the vehicle's engine compartment with teh light emitting diodes extended to the dashboard thereof in an associated housing for viewing through the window of the vehicle. This would obviate the need for the theft prevention means. Yet another application of the present invention would be in the art of power bars for the purpose of monitoring the electrical load being supplied by the power bar.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved indicating power cord system comprising, in combination:

a housing having a top face, a bottom face, a pair of end faces, and a pair of side faces defining an interior space;

an elongated extension cord having a first end connected to one of the end faces of the housing via a grommet and a second end having a plug coupled thereto for being releasably inserted in a standard electrical receptacle to receive power therefrom;

a first electrical outlet positioned on one of the side faces of the housing and electrically connected directly to the extension cord for receiving power therefrom unconditionally;

a second electrical outlet positioned on one of the side faces of the housing opposite of the first electrical outlet for being electrically connected to a block heater of a vehicle, the second electrical outlet electrically connected to the extension cord with a relay contact and associated relay coil connected therebetween, the relay contact having a closed unbiased orientation upon the lack of receipt of current by the relay coil and an open biased orientation upon the receipt of current by the relay coil;

a thermistor positioned adjacent an engine of a vehicle, the thermistor having an elongated cord attached thereto with such cord having a plug adapted to be releasably inserted within an adapter positioned on one of the end faces of the housing, the thermistor connected to the relay coil when the plug is inserted within the adapter for providing current thereto upon the engine block reaching a predetermined temperature;

rectifier means including a transformer connected to the plug of the extension cord with a bridge rectifier and a voltage regulator connected thereto for providing direct current when the plug is connected to the standard electrical receptacle;

an actuation light emitting diode connected to the rectifier means for illuminating when the plug is in receipt of power;

current detection means connected to the plug of the extension cord, the current detection means adapted to provide a voltage upon the flow of current between the plug of the extension cord and the outlets;

a plurality of power consumption indicating light emitting diode circuits connected to the current detection means for receiving power therefrom, each power consumption indicating light emitting diode circuit adapted to emit a light upon the receipt of a unique corresponding power level signal;

control circuitry connected to the rectifier means for receiving power therefrom, the control circuitry further connected to the plurality of power consumption indicating light emitting diode circuits, the control circuitry adapted to emit a power level signal to the power consumption indicating light emitting diode circuits that corresponds to the level of power being consumed by the outlet; and theft prevention means including an eyelet formed in the housing and a cable having a first end with a loop formed therein and a second end with a ball coupled thereto, whereby the cable may be situated through the eyelet and the ball may subsequently situated through the loop such that the ball may be situated within the engine compartment of the vehicle with the housing remaining exterior of the vehicle thereby precluding the theft of the housing.

* * * * *